(12) United States Patent
Kramer et al.

(10) Patent No.: US 9,425,574 B2
(45) Date of Patent: Aug. 23, 2016

(54) CAST FORMING METHODS FOR MAKING SEALED CONDUCTORS

(71) Applicants: Jeffrey John Kramer, North Ridgeville, OH (US); Robert Salvatore Terracina, Lagrange Park, IL (US)

(72) Inventors: Jeffrey John Kramer, North Ridgeville, OH (US); Robert Salvatore Terracina, Lagrange Park, IL (US)

(73) Assignee: TPC WIRE & CABLE CORP., Independence, OH (US)

(*) Notice: Subject to any disclaimer, the term of this patent is extended or adjusted under 35 U.S.C. 154(b) by 237 days.

(21) Appl. No.: 13/840,211

(22) Filed: Mar. 15, 2013

(65) Prior Publication Data

US 2013/0303010 A1   Nov. 14, 2013

Related U.S. Application Data

(60) Provisional application No. 61/645,773, filed on May 11, 2012.

(51) Int. Cl.
| | |
|---|---|
| H01R 43/00 | (2006.01) |
| H05K 13/00 | (2006.01) |
| H01R 43/20 | (2006.01) |
| H01R 13/52 | (2006.01) |
| H01R 13/504 | (2006.01) |
| B29C 45/14 | (2006.01) |
| H01R 13/213 | (2006.01) |
| H01R 13/533 | (2006.01) |
| H01R 24/20 | (2011.01) |
| H01R 101/00 | (2006.01) |
| B29L 31/34 | (2006.01) |

(52) U.S. Cl.
CPC ......... *H01R 43/20* (2013.01); *B29C 45/14418* (2013.01); *B29C 45/14426* (2013.01); *H01R 13/504* (2013.01); *H01R 13/5221* (2013.01); *H01R 43/005* (2013.01); *B29C 45/14639* (2013.01); *B29L 2031/3462* (2013.01); *H01R 13/213* (2013.01); *H01R 13/533* (2013.01); *H01R 24/20* (2013.01); *H01R 2101/00* (2013.01)

(58) Field of Classification Search
CPC  H01R 43/20; H01R 13/5221; H01R 13/504; H01R 43/005; H01R 13/213; H01R 13/533; H01R 2101/00; H01R 24/20; B29C 45/14418; B29C 45/14426; B29C 45/14639; B29L 2031/3462
USPC .......... 29/874, 876, 883, 857, 858; 257/712; 439/282, 652
See application file for complete search history.

(56) References Cited

U.S. PATENT DOCUMENTS

| | | | | |
|---|---|---|---|---|
| 3,611,255 A | * | 10/1971 | Shroyer | 439/282 |
| H0000113 H | * | 8/1986 | McNeel | 439/458 |
| 7,514,784 B2 | * | 4/2009 | Mayuzumi et al. | 257/712 |

* cited by examiner

*Primary Examiner* — Donghai D Nguyen
(74) *Attorney, Agent, or Firm* — Ladas & Parry LLP (57) ABSTRACT

A sealed connector assembly connects a first cable to a second cable and includes female and male terminal assembly components each having molded in place a weather resistant sleeve that both covers the respective terminal assembly components, and defines openings or gaps which enable female and male contacts to be electrically connected and the sleeves to mechanically contact, thereby providing weather and element resistance. In a method for insulating the respective female and male terminals in a mold assembly, an O-ring applied to the terminal components to prevent liquid mold material from flowing over the electrical contacts.

11 Claims, 7 Drawing Sheets

CAST FORMING METHODS FOR MAKING SEALED CONDUCTORS

CROSS REFERENCE TO RELATED PATENT APPLICATION

The present application claims priority to U.S. Provisional Patent Application No. 61,645,773, filed May 11, 2012, incorporated herein by reference in its entirety.

BACKGROUND

1. Technical Field

The present invention relates generally to the field of electrical connectors and, more specifically, relates to pre-fabricated electrical connectors that readily provide a protective, sealed, and releasable electrical connection between electrical cable ends.

2. Related Art

Conduit connectors for various specialty applications, such as nuclear reactors, marine applications, and high frequency electronic components, frequently are required to afford protection of the conduits against heat, corrosive gases and liquids, moisture and the like. However, such connectors normally are not properly designed to provide such protection over any reasonable length of time. Those connectors which employ male and female components also are frequently difficult to properly align and to attach to the conduit ends so that much time is wasted in installing, replacing and repairing such connectors. In many applications repeated movement of the connectors, for example when used in vibrating vehicles, marine applications and the like, results in loosening of the connector components, thereby permitting breach of the thermal and corrosion seals and eventually impairing the electrical connection provided by the connector.

When the connectors are constructed for interconnection in marine applications, such as auxiliary power for moored vessels, particularly when using large diameter conductors, it is usual to mount the terminal connectors and provide weatherproofing or weather resistance using "on site" molding to prevent the entrance of water into the connectors contact area in order to avoid grounding, short-circuiting, stray current and/or electrical interference of the contact members by any entering water or elements. However, due to the size of wire reels and the dimensions of the required conductors, the process of forming the covers on-site is difficult, cumbersome, and requires the presence and maintenance of mold equipment, yet does not consistently produce optimal seals.

BRIEF SUMMARY

The following embodiments relate to pre-fabricated, sealed male and female electrical connectors and a casting method for making the same. In an embodiment, a sealed connector assembly connects a first cable to a second cable and includes female and male terminal assembly components each having molded in place a weather, element resistant sleeve that both covers the respective terminal assembly components, and defines openings or gaps which enable female and male contacts to be electrically connected and the sleeves to mechanically contact, thereby providing weather and element resistance. In particular it is believed that the method taught herein permits cables to meet or exceed US Navy standard OPNAVINST 11310.3B In an embodiment a method for forming insulation around an electrical contact includes fitting an o-ring on the electrical contact and inserting the electrical contact in a mold. The mold may be filled with a molten mold material. The o-ring prevents the molten mold material from flowing onto the electrical contact.

In another embodiment, a method for forming insulation around an electrical contact includes fitting an O-ring on a head bar of a mold assembly and inserting the electrical contact in a mold. When the mold is filled with a molten mold material the o-ring prevents the molten mold material from flowing onto the electrical contact. The electrical contact may be through bolted through the head bar.

In yet another embodiment, a method for forming insulation around an electrical contact includes fastening the electrical contact to a conductive cable and fitting an o-ring on the electrical contact. A head bar of an open mold assembly may be fitted to the electrical contact. The electrical contact fastened to the conductive cable may be inserted into the open mold assembly and the conductive cable is received at a recess. The open mold assembly may be closed to encase the electrical contact fastened to the conductive cable in the closed mold assembly including the head bar. Molten mold material may be injected into the mold assembly. The o-ring prevents the molten mold material from flowing onto the electrical contact. The electrical contact may be held in place in the mold assembly by the head bar. The method may further include curing the mold material within the mold assembly to form the insulation around the electrical contact, removing the insulated electrical contact from the mold assembly, and detaching the head bar.

In another embodiment, a method for forming insulation around an electrical contact includes fastening the electrical contact to a conductive cable and fitting an o-ring on a head bar of an open mold assembly. The electrical contact fastened to the conductive cable may be inserted into the open mold assembly. The open mold assembly may receive the conductive cable at a recess. The open mold assembly may be closed to encase the electrical contact fastened to the conductive cable in the closed mold assembly including the head bar. Molten mold material may be injected into the mold assembly. The O-ring prevents the molten mold material from flowing onto the electrical contact. The method may further include bolting the electrical contact to the head bar, curing the mold material within the mold assembly to form the insulation around the electrical contact, removing the insulated electrical contact from the mold assembly, and detaching the head bar.

The foregoing methods result in an insulated cover system, one on each end of an electrical cable, which provides a water and weather tight seal when connected, yet permits disconnection, reconnection and connection of additional cables in series, as needed.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The various embodiments will now be described with reference to the attached drawings.

BRIEF DESCRIPTION OF THE DRAWINGS

FIGS. 8 and 9 illustrate the female and male contacts removed from the mold assemblies illustrated in FIGS. 5 and 6, respectively.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

An embodiment of a sealed connector assembly for an electric cable is illustrated in FIGS. 1-4. The sealed connector assembly includes female and male terminal assembly components, hereinafter referred to as a female connector 100 and a male connector 200, shown in FIGS. 1 and 2, respectively. Each respective connector has molded in place a weather resistant sleeve that both covers the respective connector, and defines openings or gaps which enable the female and male connectors to be electrically connected and the sleeves to mechanically contact so that weather and element resistance is provided by the hermetic, connected terminal assembly. The female and male terminals may attach by way of any type of electrical terminal contact known in the art, such as, for example, female and male ball nose contacts.

Figure 1:
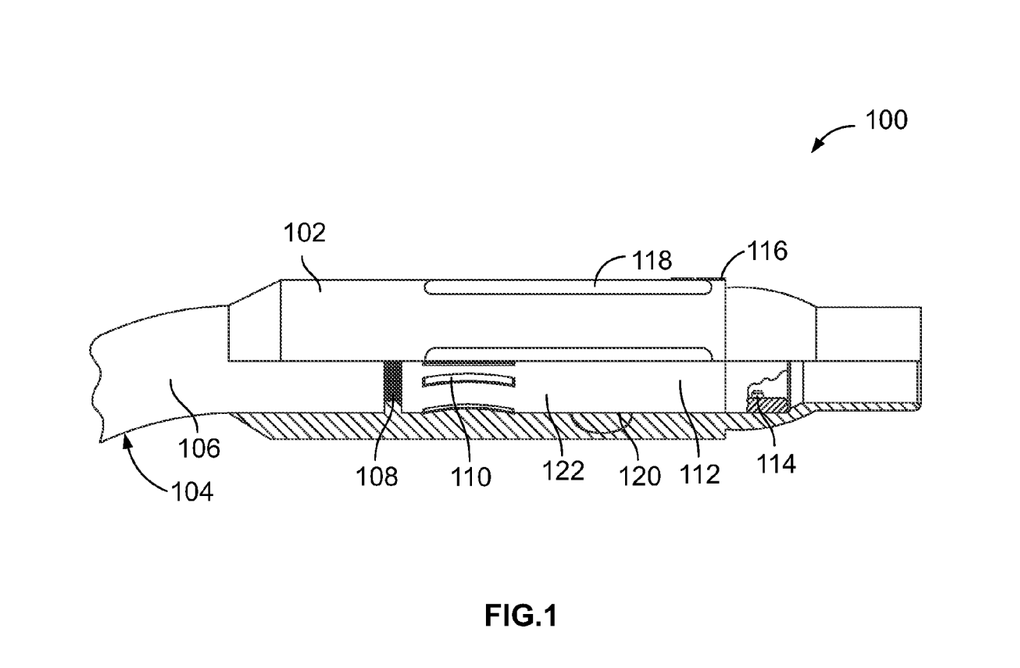
FIGS. 1, 2, 3(A), 3(B), and 4(A) and 4(B) illustrate an embodiment of a sealed connector for an electric cable.
Figure 3A:
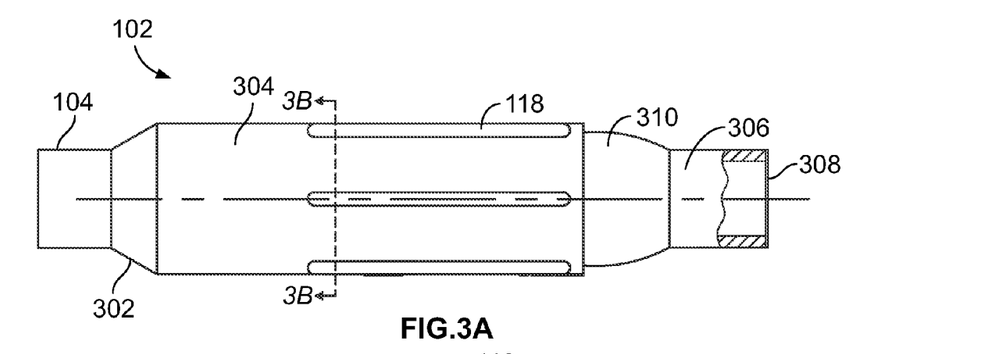
Figure 3B:
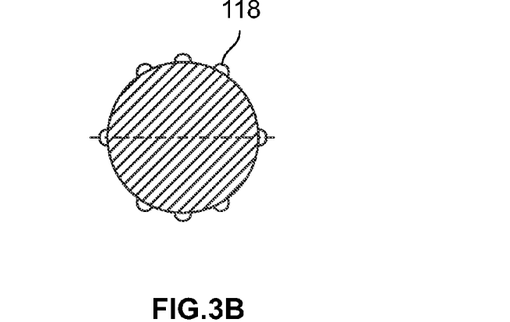

Referring to FIG. 1, the female connector 100 includes a first insulator 102 (also referred to as a female ball nose sleeve), shown in more detail in FIG. 3(A). The first insulator 102 has a first end 302 and insulator body 304 that is sealed, by way of a molding method discussed below, to a cable 104. The cable 104 includes insulation 106 surrounding a conductor 108. A female electrical connector 112 includes an electrical contact 120 that may be soldered, welded, clamped, crimped and/or otherwise securely fastened to conductor 108. In the illustrated embodiment, a cable crimp 110 securely fastens the electrical contact 120 to the conductor 108. The first insulator 102 has a second end 306 having an opening 308 for receiving a male contact 212 of the male connector 200.

Figure 2:
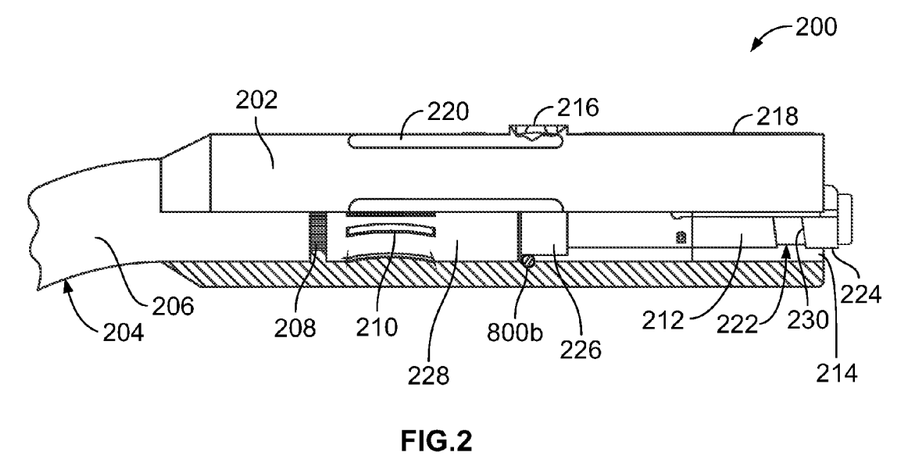
Figure 4A:
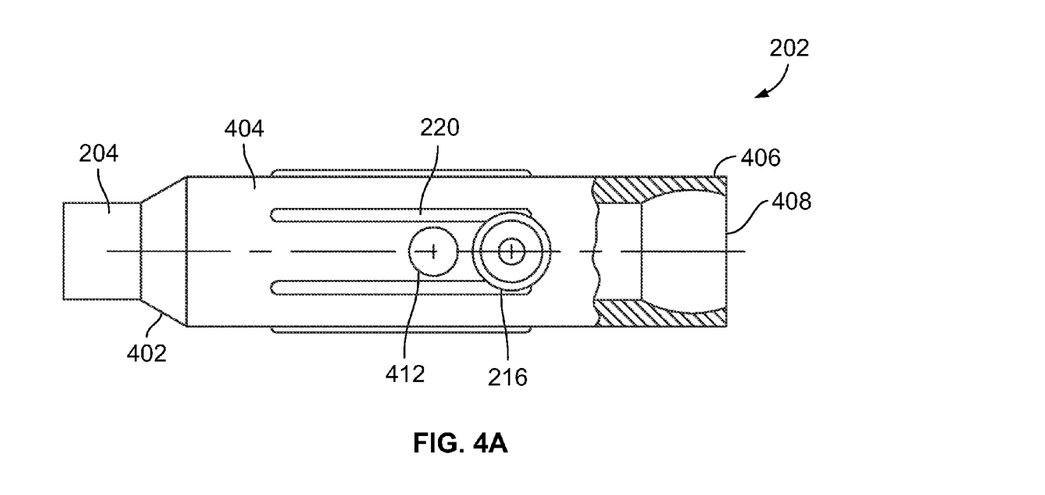
Figure 4B:
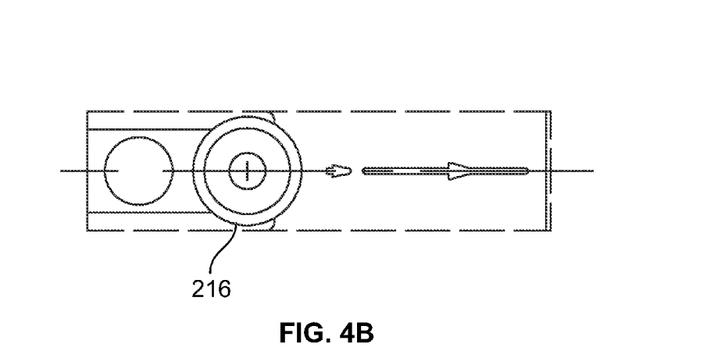

Referring to FIG. 2, the male connector 200 includes a second insulator 202 (also referred to as a male ball nose sleeve), shown in more detail in FIG. 4(A). The second insulator 202 has a first end 402 and insulator body 404 that is sealed, by way of a molding method discussed below, to a cable or cable end 204. The cable or cable end 204 includes insulation or insulation end 206 surrounding a second conductor or conductor end 208.

Figure 10:
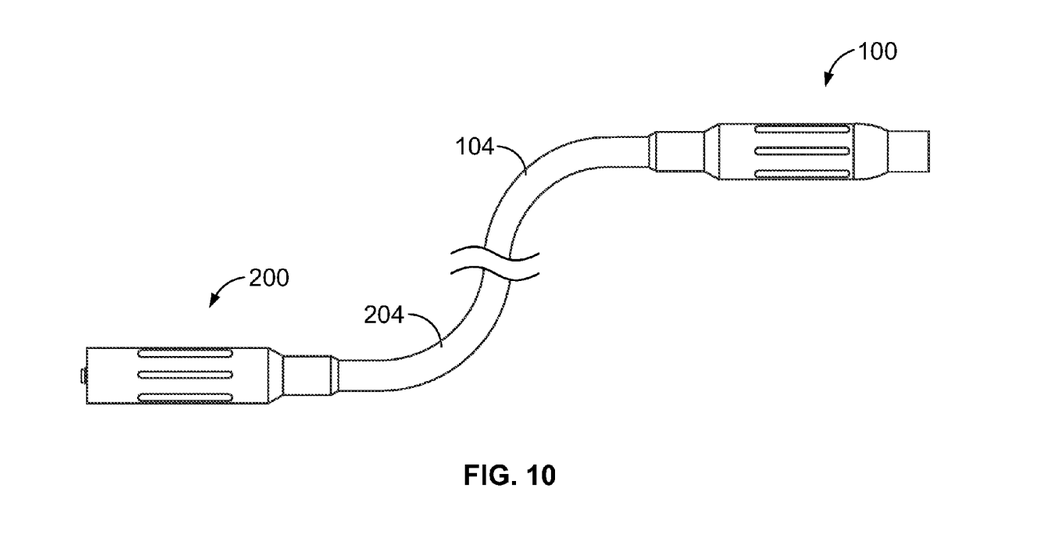
FIG. 10 illustrates a cable having female and male contacts at opposite ends thereof.

It will be noted that female 100 and male 200 connectors are preferably formed on opposed ends of a single cable (illustrated in FIG. 10) such that conductor 108 and conductor 208 may be first and second ends of the same cable. Similarly, insulation 106, 206 may be continuous, so that the reference numbers refer to first and second ends of the same continuous insulation. In this manner cables can be formed in spools or reels that are manageable to manufacture, ship, store and deploy. Multiple cables can then be interconnected, end-to-end to desired total length, and owing to the bonding of the connector covers to the cable insulation and the mechanical interconnection of the connectors and their respective seals, cable runs of high weather resistance can be obtained. For the purposes of this application the reference numbers and description refer to separate ends, but this convention is not intended to limit the invention to either forming a single or utilizing multiple cables.

The second insulator 202 has a second end 406 having an opening 408 through which the male contact 212 passes. The male contact 212 may be soldered, welded, clamped, crimped and/or otherwise securely fastened to conductor 208. In the illustrated embodiment, a cable crimp 210 securely fastens the electrical contact 226 to the conductor 208, thereby providing an electrical connection from the conductor 208 to the male contact 212.

The first and second insulators 102 and 202 may comprise cylindrical and conical portions as illustrated. Conductor 108 of the female connector 100, and conductor 208 of the male connector 200 may be comprised of any conductive material which has low resistance to the electrical power that is to be carried through the connector. In one embodiment, brass may be utilized as the electrical conductors 108 and 208. Other suitable materials may also be utilized. As noted above, the electrical conductors 108 and 208 may be molded into their respective insulators. The shape, mounting, and/or arrangements of the metal conductors may vary so long as they comply with the constraints of the connection requirements.

The female and male connectors 100 and 200 are mated by inserting male contact 212 into opening 308 of the first insulator 102. The second end 406 of the second insulator 202 engages a rounded-conical segment 310 of the second end 306 of the first insulator 102 as the male contact 212 joins the female electrical connector 112. A locking contact 114 of the female electrical connector 112 passes alongside an adjacent, recessed surface of the male contact 212 and engages recess 222. Recess 222 is partially defined by an angled front surface 230. As a user twists the female and male connectors 100 and 200 relative to one another, the locking contact 114 contacts angled front surface 230 and is forced, along with the female connector 100 toward the male connector 200, thereby sliding an undersurface of the second end 406 of the second insulator 202 along the rounded-conical segment 310 of the second end 306 of the first insulator 102. The rounded-conical segment 310 produces increasing pressure and a sealed, hermetic fit between the mating ends of the first insulator 102 and the second insulator 202, to thereby completely encase the electrical conductive components.

In the locked configuration there will be, essentially, at one section, concentric: male connector end; female connector cylindrical portion and male connector sleeve, with the end of male connector sleeve formed with a generally hemispherical concavity that distorts over the "ball end" of the female connector 100, thereby providing weather-tightness.

Referring to FIGS. 1 and 3(A), as one example of construction the first insulator 102 may be molded around a length of cable 104 whereby first end 302, second end 306, insulator body 304, and the rounded-conical segment 310 are formed during molding. Thus, the first insulator 102 and cable 104 become essentially one piece. The molding between the cable insulation 106 and first insulator 102 seals the opening in first end 302. The same seal around the cable 204 is made for second insulator 202. Other construction methods may be utilized to secure the electrical connectors to the insulators.

As illustrated in FIGS. 1 and 2, the first and second insulators 102 and 202 may include one or more ribs 118 and 220, respectively, providing a ridged surface to assist a user in gripping, manipulating, and twisting the female and male connectors 100 and 200. The first and second insulators 102 and 202 may further include alignment marks 116 and 218, respectively, to correctly align the female and male connectors 100 and 200 for mating so that locking contact 114 is aligned with angled front surface 230.

Referring to FIGS. 2 and 4(A), the second insulator 202 may include a release mechanism 216 that may be depressed to unlock the male connector 200 from the female connector 100, allowing locking contact 114 to disengage from recess 222. Details of the release mechanism 216 are illustrated with reference to FIGS. 7(A) and 7(B).

Figure 5:
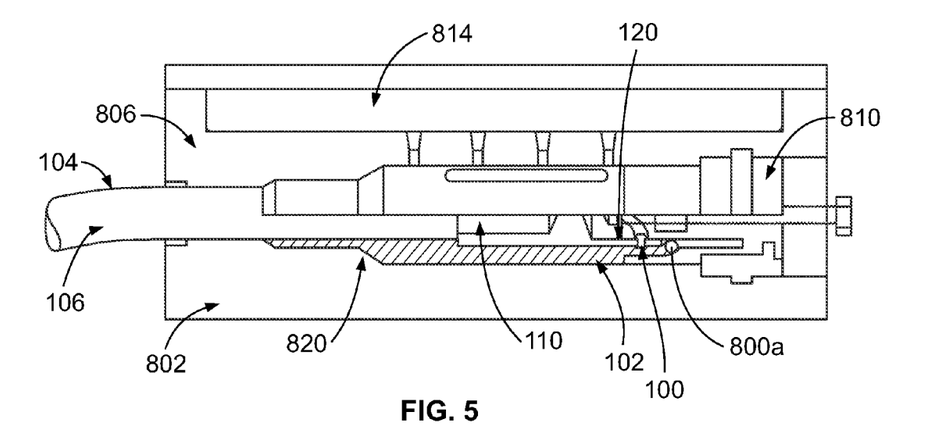
FIGS. 5 and 6 illustrate female and male contacts in mold assemblies.
Figure 6:
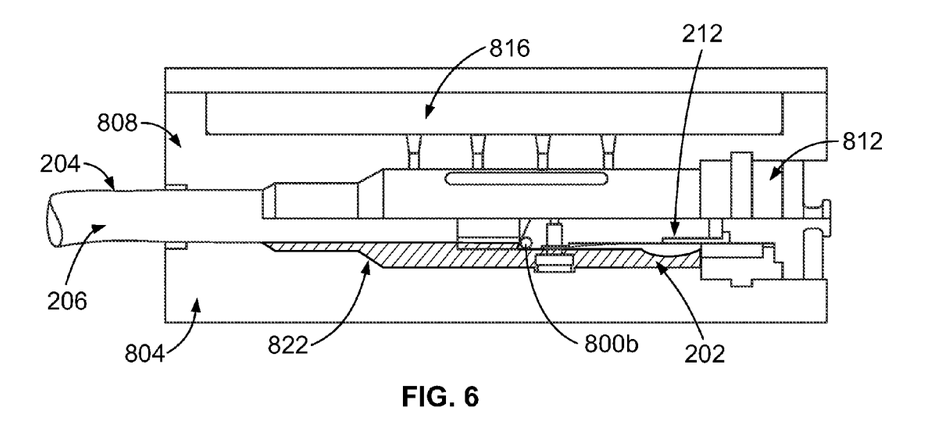

FIGS. 5 and 6 illustrate, respectively, preferred mold assemblies for casting the first and second insulators 102 and 202 around the female and male contact assemblies, including insulation 106 and 206. As noted above, these will typically be formed on opposite ends of a single cable.

Figure 7A:
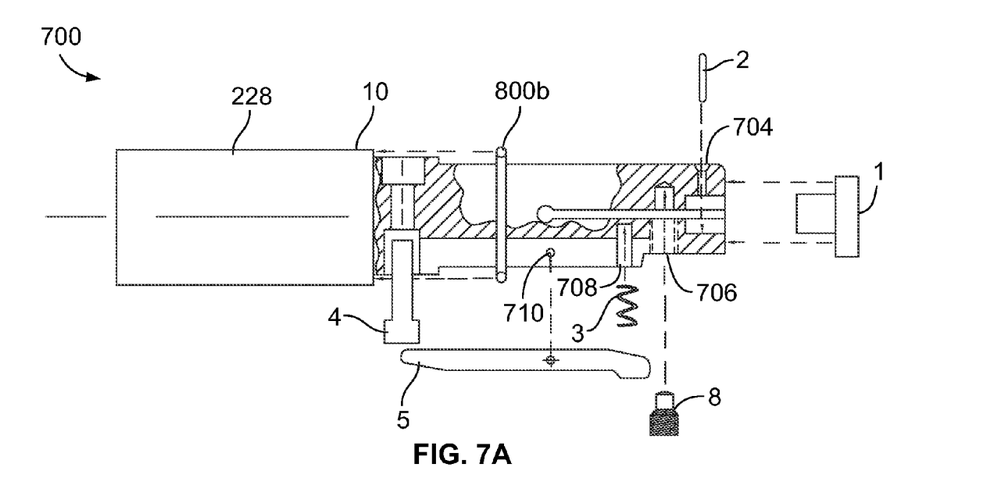
FIGS. 7(A) and 7(B) illustrate male contact assembly instructions.
Figure 7B:
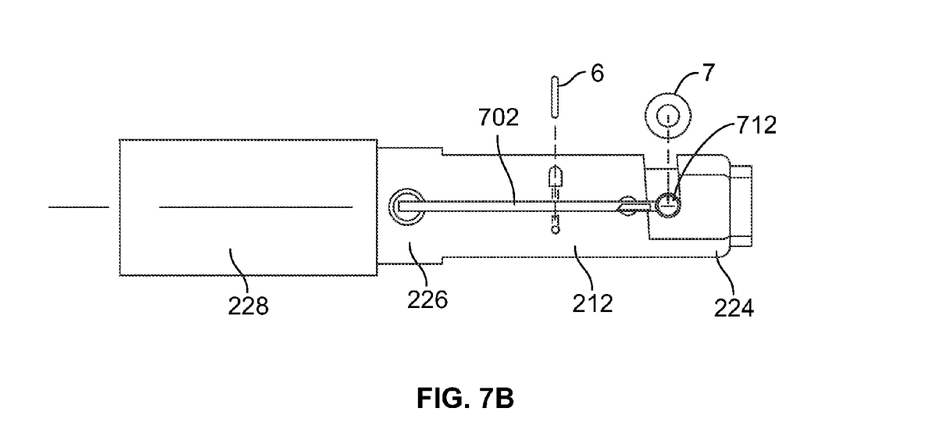

FIGS. 7(A) and 7(B) illustrate components that comprise the male body 700, including the cable crimp 228, the electrical contact 226, the male contact 212, forward segment 224, as well as components of the locking and release mechanisms.

Prior to placing the male body 700 in the mold, the release mechanism 216 is assembled. In assembling the release mechanism 216 the male body 700 is inverted and placed into a holding fixture with the slot 702 facing up. The body is clamped in the holding fixture. Bumper 1 is aligned so that its axis is aligned with the axis of the male body 700, and is tapped into place until the shoulder seats. A hole 704 is drilled in the conductor and a roll pin 2 is placed therein and driven downward until it is seated in the hole to retain bumper 1. A return spring 3 is inserted into a first opening 706 and a release button 4 is inserted into a second opening 708 as illustrated in FIG. 7A. A latching arm 5 is inserted into the slot 702 and a dummy pin is inserted into opening 710. Roll pin 6 is inserted into opening 710 and driven in until seated flush with flat. The holding fixture is loosened, the male body 700 is rotated 90 degrees, and then the holding fixture is tightened. Four stacked conical washers 7 are slid into slot 712 until the holes align. Conical washers 7 provide an adjustable tension for set screw 8, as described below. A pin or tool is inserted into the threaded hole for washer alignment. Set screw 8 is started with an appropriately sized and shaped tool, such as a $\frac{5}{32}$ in. hex tool and turned until the set screw just bottoms on the washers 7.

Prior to placement in the molds, contact 212 and the head bar are fitted with respective O-rings 800 and 801 proximate the points of contact with the mold recesses 820, 822. O-rings 800 and 801 function, during the molding process, to prevent the impingement of the molten mold material over the electrically conductive, interlocking portions of the contacts 120, 212. Machine tolerances in the molds are insufficient to provide sufficient protection of the electrically conductive, interlocking portions of the contacts 120, 212 to preserve metal-to-metal contact which is essential in the functionality of the finished cable.

In forming the opposed ends of a cable, a cable will have its opposed ends 104, 204 prepared to receive connectors 100, 200 by stripping insulation 106, 206 so as to expose the conductors 108 and 208. Connectors 100, 200 will be coupled to conductor 108, 208 by suitable means such as crimping, soldering, welding or the like at crimp 110, 210. Insulation 106, 206 will be primed to bondingly receive the material used to form the insulating members 122, 228. O-ring 800 is pressed over the male contact 226. O-ring 801 is fitted to the female head bar 810. The O-rings may be fitted using a tool such as a cylinder or pipe until the O-rings 800 and 801 are seated on the shoulders of the respective conductive portion of the contact 226, and the head bar 810 without twisting. FIG. 5

Each mold comprises four main parts, bottom mold half 802, 804, top mold half, 806, 808, head bar 810, 812 and press plate 814, 816. Bottom mold half 802, 804 is placed on a bench or other fixture. Connectors are fitted to head bars 810, 812, which close the head end of each mold. Contacts 120, 226, already crimped on a continuous length of cable at respective ends 104, 204. O-ring 800 and 801 are in place as described above. The contacts 120, 226 are received in a recess 820, 822 in the bottom of each respective mold half. For the female mold, contact 120 can be through bolted through head bar 810. For the male mold, contact 226 is held in place by being received in an aperture in head bar 812

In operation, top half 806 closes on bottom half 802, connector, cable and head bar with recesses 820, 822 defining a cavity 824 open to receive mold material to surround connector and cable with O-rings 800 and 801 preventing flow over the metallic portions ends of contacts 120, 226. When closed, heated and pressurized, elastomeric material fills the mold cavity. Preferably solid rubber can be stacked in top receiver cavities 826, 828 and when heated, pressure from press plate 814, 816 causes molten rubber to pass through apertures 832, 830 to fill the cavity defined by recesses.

The O-rings 800 and 801 provide seals to permit the respective contacts 120, 226 to be placed in a mold, and with mold material applied over (see FIG. 6) that portion of the cable 104, 204 and insulation 106, 206 and fill the mold cavities while not impinging on the male and female metallic contact portions. The first and second insulators 102, 202 are formed, yet O-rings 800 and 801 prevent the mold material from flowing over the electrical contacts. O-ring 800 may be left in place after the mold is removed. O-ring 801, on head bar 810 can be removed with the head bar. The O-rings may be constructed of a material that can withstand the temperatures that the sealed connector achieves when being molded and when in use.

Figure 8:
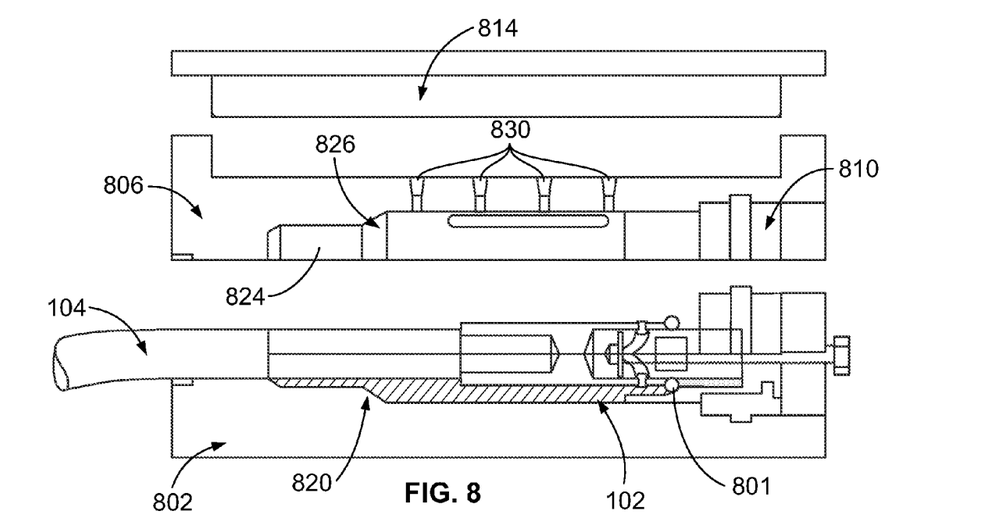
Figure 9:
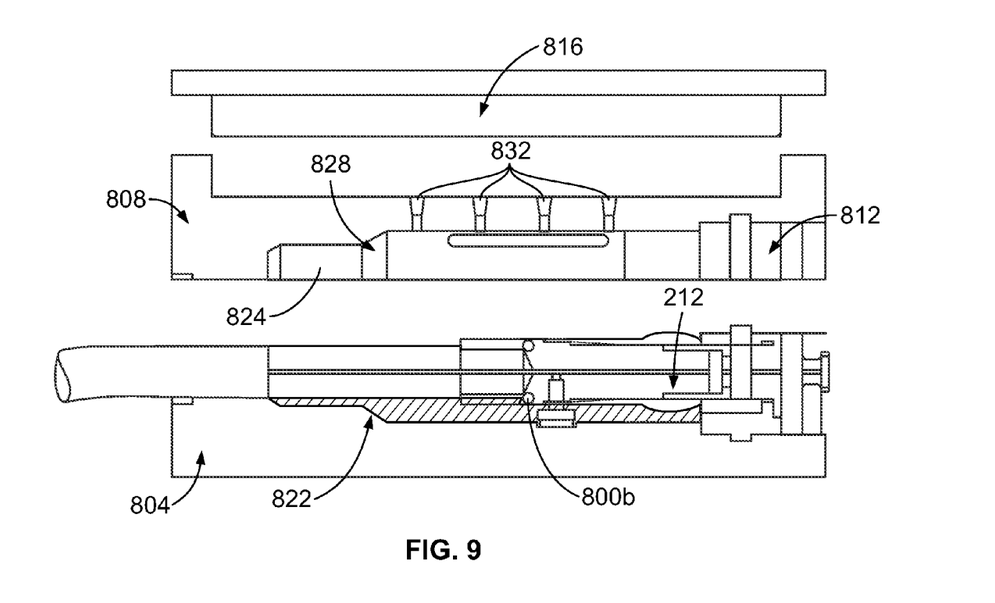

Upon solidifying of the elastomeric material each connector 100, 200 is removed from its respective mold 802-806, 804-808. Male connector 200 has insulation formed around release mechanism 216. In order to preserve watertightness the opening in insulating member 202 through which button 4 is exposed is covered with an adhesively sealed covering member 850.

In the foregoing description, all or some of the internal conducting elements are preferably machined or otherwise formed of metal, with plating for corrosion resistance, but, preferably, not a chemical, adhesive or mechanical machining to provide improved cover attachment/adhesion.

It is intended that the foregoing detailed description be understood as an illustration of selected forms that the invention can take and not as a definition of the invention. It is only the following claims, including all equivalents, that are intended to define the scope of this invention.

We claim:

1. A method for forming insulation around an electrical contact, the method comprising: fitting an o-ring on the electrical contact; and inserting the electrical contact in a mold and filling the mold with a molten mold material, wherein during the molding process, the o-ring prevents the molten mold material from flowing onto the electrical contact wherein the electrical contact is connected to an electrically conductive cable that is partially contained within the mold.

2. The method of claim 1 further comprising receiving the electrical contact in an aperture in a head bar of the mold.

3. A method for forming insulation around an electrical contact, the method comprising: fitting an o-ring on a head bar of a mold assembly; and
  inserting the electrical contact in a mold and filling the mold with a molten mold material, wherein
  during the molding process, the o-ring prevents the molten mold material from flowing onto the electrical contact wherein the electrical contact is connected to an electrically conductive cable that extends beyond the mold.

4. The method of claim 3 further comprising through bolting the electrical contact through the head bar.

5. A method for forming insulation around an electrical contact, the method comprising: fastening the electrical contact to a conductive cable;
  fitting an o-ring on the electrical contact;
  fitting a head bar of an open mold assembly to the electrical contact;
  inserting the electrical contact fastened to the conductive cable into the open mold assembly, wherein the open mold assembly receives the conductive cable at a recess;
  closing the open mold assembly to encase the electrical contact fastened to the conductive cable in the closed mold assembly including the head bar; and
  injecting molten mold material into the mold assembly, wherein the o-ring prevents the molten mold material from flowing onto the electrical contact, wherein the electrical contact is connected to an electrically conductive cable that extends beyond the mold.

6. The method of claim 5 wherein the electrical contact is held in place in the mold assembly by the head bar.

7. The method of claim 5 further comprising:
  curing the mold material within the mold assembly to form the insulation around the electrical contact;
  removing the insulated electrical contact from the mold assembly; and detaching the head bar.

8. A method for forming insulation around an electrical contact, the method comprising: fastening the electrical contact to a conductive cable;
  fitting an o-ring on a head bar of an open mold assembly;
  inserting the electrical contact fastened to the electrically conductive cable into the open mold assembly, wherein the open mold assembly receives the electrically conductive cable at a recess and the electrically conductive cable extends beyond the mold;
  closing the open mold assembly to encase the electrical contact fastened to the conductive cable in the closed mold assembly including the head bar; and
  injecting molten mold material into the mold assembly, wherein the o-ring prevents the molten mold material from flowing onto the electrical contact.

9. The method of claim 8 further comprising bolting the electrical contact to the head bar.

10. The method of claim 8 further comprising: curing the mold material within the mold assembly to form the insulation around the electrical contact;
  removing the insulated electrical contact from the mold assembly; and detaching the head bar.

11. The method of claim 10 further comprising:
  forming a first cable end in accordance and a second cable end wherein said first cable end is adapted to receive said second cable end so as to provide a water and weather tight seal when connected, and also permitting disconnection, reconnection and connection of additional cables in series, as needed.

* * * * *